US011636335B2

United States Patent
Li et al.

(10) Patent No.: US 11,636,335 B2
(45) Date of Patent: Apr. 25, 2023

(54) SYSTEM AND METHOD FOR CONTENT DISCOVERY

(71) Applicant: Sky CP Limited, Middlesex (GB)

(72) Inventors: Jian Li, Middlesex (GB); Simon Driscoll, Middlesex (GB); Leanne Cummings, Middlesex (GB); Matthew Bromage, Middlesex (GB); Aarti Parmar, Middlesex (GB)

(73) Assignee: Sky CP Limited, Middlesex (GB)

( * ) Notice: Subject to any disclaimer, the term of this patent is extended or adjusted under 35 U.S.C. 154(b) by 465 days.

(21) Appl. No.: 16/643,192

(22) PCT Filed: Apr. 27, 2018

(86) PCT No.: PCT/GB2018/051121
§ 371 (c)(1),
(2) Date: Feb. 28, 2020

(87) PCT Pub. No.: WO2019/043352
PCT Pub. Date: Mar. 7, 2019

(65) Prior Publication Data
US 2020/0193288 A1 Jun. 18, 2020

(30) Foreign Application Priority Data
Aug. 29, 2017 (GB) .................................. 1713801

(51) Int. Cl.
*G06F 16/00* (2019.01)
*G06N 3/08* (2023.01)
(Continued)

(52) U.S. Cl.
CPC .............. *G06N 3/08* (2013.01); *G06F 16/22* (2019.01); *G06F 16/248* (2019.01);
(Continued)

(58) Field of Classification Search
CPC .......... G06N 3/08; G06N 3/0454; G06N 5/04; G06N 3/0472; G06N 3/0445; G06F 16/22;
(Continued)

(56) References Cited

U.S. PATENT DOCUMENTS 8,489,527 B2   7/2013   van Coppenolle et al.
2016/0314404 A1   10/2016   Carmichael et al.
(Continued)

FOREIGN PATENT DOCUMENTS

CN   107480774 A   * 12/2017
WO   2017/106977 A1   6/2017

OTHER PUBLICATIONS

International Search Report of the International Searching Authority dated Jul. 26, 2018, issued in connection with International Application No. PCT/GB2018/051121 (3 pages).
Written Opinion of the International Searching Authority dated Jul. 26, 2018, issued in connection with International Application No. PCT/GB2018/051121 (8 pages).

*Primary Examiner* — Dinku W Gebresenbet
(74) *Attorney, Agent, or Firm* — McCarter & English, LLP

(57) ABSTRACT

Systems and methods for presenting content to a user are described. A trained neural network is stored in memory, defining input nodes representing respective attribute values of attribute types, and weights embodying strengths of connections between the input nodes and hidden nodes, as trained for the particular user. Sub-models of the neural network are defined from sets of input nodes of the same attribute type and a corresponding hidden state matrix of trained weights. A request for content assets is processed using a retrieved first sub-model corresponding to a query attribute type and second sub-model corresponding to a target attribute type, to determine relevancy parameters for (Continued)

the user. Content assets are selected for presentation by a media receiver device, based on the determined relevancy parameters. Other embodiments are also described and claimed.

19 Claims, 10 Drawing Sheets

(51) Int. Cl.
  *G06F 16/22* (2019.01)
  *G06F 16/2457* (2019.01)
  *G06F 16/248* (2019.01)
  *G06F 16/25* (2019.01)
  *G06N 3/04* (2023.01)
  *G06F 17/16* (2006.01)

(52) U.S. Cl.
  CPC ...... *G06F 16/24575* (2019.01); *G06F 16/252* (2019.01); *G06N 3/0454* (2013.01); *G06F 17/16* (2013.01)

(58) Field of Classification Search
  CPC ............. G06F 16/24575; G06F 16/248; G06F 16/252; G06F 17/16; G06F 16/7867; G06F 16/732; H04N 21/25; H04N 21/45
  See application file for complete search history.

(56) References Cited

U.S. PATENT DOCUMENTS

| | | |
|---|---|---|
| 2016/0350834 A1 | 12/2016 | Wilson et al. |
| 2016/0358024 A1* | 12/2016 | Krishnakumar ..... G06V 10/449 |
| 2017/0017649 A1* | 1/2017 | Srinivasaraghavan .. G06N 3/08 |
| 2017/0103343 A1 | 4/2017 | Yee et al. |
| 2017/0104845 A1* | 4/2017 | Beattie, Jr. ............ H04L 47/781 |
| 2017/0132509 A1 | 5/2017 | Li et al. |
| 2017/0140262 A1 | 5/2017 | Wilson et al. |
| 2017/0193368 A1 | 7/2017 | Le Grand et al. |
| 2017/0228385 A1* | 8/2017 | Zheng ................. G06N 3/0454 |
| 2018/0075508 A1* | 3/2018 | Hewavitharana .. G06Q 30/0601 |
| 2018/0192079 A1* | 7/2018 | Riedl .................. H04N 21/812 |

* cited by examiner

SYSTEM AND METHOD FOR CONTENT DISCOVERY

FIELD OF THE INVENTION

This invention relates generally to machine learning for content discovery, and more particularly to systems and methods for searching or recommending content items based on trained metadata correspondence models.

BACKGROUND

Content discovery is one kind of service that helps users to find and explore content items from content providers in order to meet users' needs. There are generally two ways of machine-assisted discovery of content items for users. First, typical search services provide users the capability of retrieving the content items that users are looking for, based on input search criteria. Second, typical recommendation services provide the capability of identifying content items that can be relevant to users' needs and suggesting identified content items to users as recommendations rather than in response to direct user requests.

Such search and recommendation services are common and prevalent in the media industry. For example, in a current Sky® Set-Top Box (STB), users can use a remote controller to input the title of a TV programme they want to watch and a Sky® search service will retrieve content data for matching programmes, such as descriptions and actual video content, and present the content data to users' STB. For recommendation, the current Sky® recommendation engine collects what programmes a user has watched in the past from activity data from the STB, and retrieves and presents to the user a number of similar TV programmes that the user has not watched, as recommendations.

Traditional content discovery services as described above are mainly focussed on helping users to discover information at the TV programme level. However, in reality, users' preference of interacting with media content discovery services can be far more complicated than just by requesting TV programmes.

What is desired is a better system and method for content discovery that provides for greater flexibility. However, providing greater flexibility also introduces technical challenges to be addressed.

SUMMARY OF THE INVENTION

According to one aspect, the present invention provides a computer-implemented method of presenting content to a user, comprising
  storing, in a memory, data defining a trained neural network including a plurality of input nodes each connected to a plurality of hidden nodes, each input node representing an associated attribute value of one of a plurality of predefined attribute types, each connection having an associated weight embodying a strength of connection between the corresponding nodes as trained for the particular user, and wherein each set of input nodes corresponding to the same attribute type forms a respective sub-model of the neural network, each sub-model consisting a hidden state matrix of trained weights between the associated set of input nodes and said plurality of hidden nodes;
  processing a request for content assets, the request identifying an attribute value of a query attribute type, using a retrieved first sub-model corresponding to a query attribute type and second sub-model corresponding to a target attribute type, to determine relevancy parameters for the user; and
  selecting one or more content assets for presentation by a media receiver device based on a determined relevancy parameter.

Processing the request may further comprise retrieving, from the memory, first and second sub-models of the trained neural network, the first sub-model corresponding to a query attribute type and the second sub-model corresponding to a target attribute type; determining one or more relevancy parameters for the user by combining the hidden state matrices of the retrieved first and second sub-models; and using the attribute value identified in the request as an index to retrieve a hidden state vector from the combined hidden state matrix, the hidden state vector defining parameters embodying predicted relevancy between the query attribute type and the target attribute type for the user.

According to another aspect, the present invention provides a method of providing content using predictive control, comprising
  receiving data identifying a query for content items, the query data identifying an attribute value of a query attribute type;
  selecting first and second sub-models from a trained artificial neural network model comprising a plurality of sub-models, the first sub-model corresponding to the query attribute type and the second sub-model corresponding to a target attribute type, each sub-model corresponding to a respective attribute type and defining a plurality of trained weights between a plurality of input nodes each representing a corresponding attribute value of the respective attribute type, and a plurality of hidden nodes of the artificial neural network;
  predicting user behaviour by combining the selected first and second sub-models from the trained model, selecting a subset of data from the combined sub-model using the identified attribute value from the query data as an index to address the combined sub-model, and sorting the subset of data by a defined criteria, wherein the sorted subset of data defines a ranked association between the query attribute type and the target attribute type as a computed parameter of predicted user behaviour; and
  outputting data to control the identification and provision of one or more content items based on the computed parameter of predicted user behaviour.

Each sub-model may be a two-dimensional matrix of trained weights. The sub-models from the trained model may be combined by multiplying a first matrix of trained weights with a transpose of a second matrix of trained weights to compute a matrix multiplication result. The identified attribute value from the query data may be used as an index to address a row of the matrix multiplication result.

The subset of data may be sorted into ascending or descending order based on the weights to determine a corresponding sorted list of attribute values of the target attribute type.

The query may be a request for content items that match similarity or search criteria, including the attribute value.

The query data may identify a plurality of attribute values of the same query attribute, and wherein each attribute value is used as an index to retrieve a respective subset of data from the combined sub-model, the plurality of subsets of data being combined and sorted to define the ranked association between the query attribute type and the target attribute type as the computed parameter of predicted user behaviour.

The sub-models of the artificial neural network model may be trained by:
- collecting metadata from a database, the metadata associated with content items in the database and including attribute values of respective entity types;
- processing the metadata to determine all unique entity types and all unique attribute values of each entity type;
- creating a feature vector for each determined entity type, each feature vector defining an addressable plurality of data values corresponding to each unique attribute value of the respective entity type in the metadata; and
- applying a contrastive divergence algorithm to each feature vector to compute respective sub-model data.

According to another aspect, the present invention provides a method of processing a data query for semantically similar programme content based on a defined attribute type, the data query identifying a broadcast channel associated with a linear schedule of programme content, the method comprising retrieving metadata of the content within a scheduling window, generating a feature vector from the retrieved metadata of the defined attribute type, generating a second query for content items, the second query including the generated feature vector as the query attribute type, and processing the second query in accordance with the above method.

According to yet another aspect, the present invention provides a method of processing a data query for semantically similar broadcast channels associated with respective linear schedules of programme content based on a defined query attribute type and value, the data query identifying the channel type as a target attribute type, the method comprising:
a) for each of a plurality of broadcast channels:
   - retrieving metadata of programme content within a scheduling window of the broadcast channel;
   - generating a feature vector from the retrieved metadata of the defined attribute type;
   - selecting first and second sub-models from a trained artificial neural network model comprising a plurality of sub-models, the first sub-model corresponding to the defined attribute type and the second sub-model corresponding to the target attribute type, each sub-model corresponding to a respective attribute type and defining a plurality of trained weights between a plurality of input nodes each representing a corresponding attribute value of the respective attribute type, and a plurality of hidden nodes of the artificial neural network;
   - combining the selected first and second sub-models from the trained model;
   - selecting a subset of data from the combined sub-model using the identified query attribute value from the query data as an index to address the combined sub-model, and
   - computing the cosine similarity between the feature vector and the selected subset of data from the combined sub-model to produce a score indicating relevancy of the broadcast channel to the query attribute value;
b) sorting the plurality of computed scores indicating relevancy of the plurality of broadcast channels to the query attribute value; and c) outputting data identifying a ranked listing of broadcast channels based on the sorting plurality of computed scores.

Advantageously, embodiments of the claimed invention enable handling of requests from users based on types of entities rather than the titles of TV programmes. For example, a user may search: "show me funny programmes" in which case the query is one type of mood, e.g., "funny", instead of specific titles of TV programmes. Embodiments also advantageously enable handling of user queries for some other types of entities to return as results rather than the titles of TV programmes. For example, a user can search "show me funny channels", in which the expected output is a list of TV channels instead of individual TV programmes.

Additionally, embodiments of the claimed invention facilitate ranking of such query results, for example determining which TV programmes are funnier than others, or the relevancy of other actors to one particular actor.

Further advantageously, the exemplary embodiments described below enable greater flexibility in, and more accurate handling of, queries relating to content items, by a content discovery engine.

BRIEF DESCRIPTION OF THE DRAWINGS

There now follows, by way of example only, a detailed description of embodiments of the present invention, with references to the figures identified below.

DESCRIPTION OF EMBODIMENTS

Specific embodiments of the invention will now be described, directed to a computer-implemented content discovery system, which uses machine learning technology to learn relationships among a number of types of metadata entities embedded in content metadata associated with corresponding video data of content items.

Figure 1:
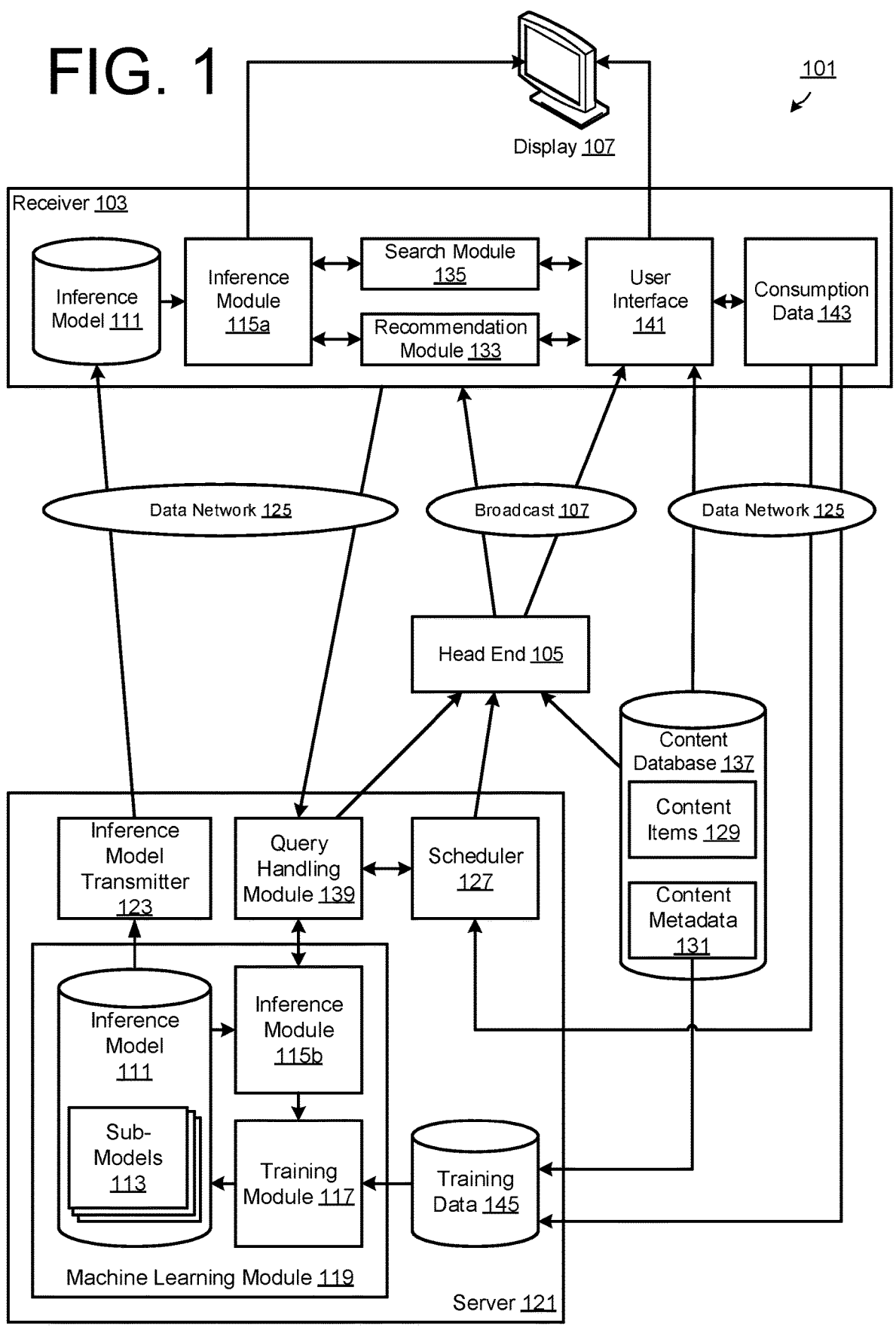
FIG. 1 is a data flow block diagram showing the main components of a content discovery system 101 according to an exemplary embodiment of the invention.

FIG. 1 shows schematically the main components of a content discovery system 101 in an exemplary embodiment of the present invention. This embodiment includes both broadcast video content, via a broadcast channel, and video-on-demand (VOD) content, via a data network such as the Internet, to a receiver 103 such as a set-top box. However, aspects of this embodiment may be applied to broadcast-only or VOD-only systems. Hence, the receiver 103 is just one example of a media client which may be used in the present invention; other examples include personal media players, smart phones, tablet or desktop computers, Internet TV devices and the like.

The receiver 103 is arranged to receive broadcast channels from a head end 105 over a broadcast link 107, and to output at least one of the received broadcast channels to a display 109. The receiver 103 stores inference model data 111, defining matrices 113 of parameters in this exemplary embodiment, which is used by an inference engine 115 to process input query attributes to compute parameters of predicted user behaviour. Inference is the computation that enables ranking of different types of entities in the content discovery system 101. The inference model data 111 may be trained by training module 117 of a machine learning module 119 at a server 121 remote from the receiver 103 (e.g. communicatively coupled to the head end 105 or a separate back end function), which stores the inference model data 111 for substantially all the users of the system 101.

The training module 117 of the machine learning module 119 generates the inference model 111 by processing training data sets from a core training data corpus 145 input to the training module 117. The inference model 111 is defined by a plurality of sub-models 113, matrices in this exemplary embodiment. Each sub-model 113 defines a structured set of trained parameter values, corresponding to a respective attribute type and defining a plurality of trained weights between a plurality of input nodes and a plurality of hidden nodes of the artificial neural network, each input node representing a corresponding attribute value of the respective attribute type.

The inference model data 111 may be selected by machine learning module 119 and sent to an inference model data transmission function 123, which transmits the inference model data 111 to the receiver 103, for example over a data network 125 such as the Internet.

A scheduling module 127 of the server 121 can determine a programme broadcast schedule and sends this to head end 105, from which broadcast schedule information is broadcast to the receiver 103. The broadcast schedule information includes metadata 129 relating to individual media content items 129 within the broadcast schedule. The broadcast schedule information is made available to the receiver 103, for example to a user interface 141 (e.g. an electronic programme guide, EPG, user interface), a recommendation module 133 and/or a search module 135 of the receiver 103. The head end 105 also broadcasts media content items at the times and in the channels determined by the programme broadcast schedule. These media content items may be obtained from a content database 137 or a content delivery network (CDN), or may simply be made available on recorded media at the head end 105.

The content database 137 may also be accessible for delivery of VOD media content items to the receiver 103, for example over the data network 125. Information about the media content items available for VOD delivery can also be made available to the recommendation module 133 and the search module 135, including metadata 129 relating to individual media content items 129.

Consumption data 143 is recorded at the receiver 103 indicating consumption (e.g. viewing and/or recording) of media content items by the user(s) of the receiver 103. The consumption data 143 may be passed to the recommendation module 133 and included as similarity criteria in generated queries to an inference module 115. The consumption data 143 may also be sent over the data network 125 to the server 121 for use as described below.

The scheduling module 127 can generate query data identifying a request for content items 129 that match similarity criteria including one or more query attribute values of one or more query attribute types selected or retrieved from the consumption data 143. The scheduling module 127 passes generated queries to the inference module 115b of the server 121, for example via a query handling module 139. The broadcast schedule information can include recommended content items based on the output attributes computed by the inference module 115b and metadata 131 relating to the individual media content items 129.

The recommendation module 133 can generate query data identifying a request for content items 129 that match similarity criteria including a query attribute value of a query attribute type. The search module 135 can generate query data identifying a request for content items 129 that match search criteria including a query attribute value of a query attribute type. The recommendation module 133 and the search module 135 pass the generated queries to the inference module 115a of the receiver 103. The receiver 103 can present to the user, for example on the display 107, media content items from the programme broadcast schedule and/or available VOD media content items, based on the output attributes computed by the inference module 115a and metadata 131 relating to the individual media content items 129.

The user can then select one or more recommended media content items, via the user interface 141 (e.g. an EPG user interface including a remote control). The selected media content item(s) are then output to the display 107 and/or recorded for later viewing. If a selected media content item is to be broadcast at a future time, schedule data relating to the media content item may be added to a recording list so that the media content item may be recorded at the time and from the channel indicated by the schedule data. If the selected media content item is currently being broadcast, the receiver 103 may tune to the corresponding broadcast channel and output the live broadcast to the display 107. If the selected media content item is available on VOD, the media content item may be downloaded over the data network and recorded and/or output to the display 107.

The receiver 103 may also be configured to transmit generated queries to the inference module 115b of the remote server 105 via a query handling module 139. The head end 105 can be controlled to retrieve and transmit media content items from the programme broadcast schedule and/or available VOD media content items, based on the output attributes computed by the inference module 115b and metadata 131 relating to the individual media content items 129.

Each of the modules in the receiver 103 and the server 121 may be instantiated as a multi-threaded computer process running on respective one or more computing devices. It should be appreciated that the system 101 may include other components, sub-components, modules, and devices commonly found in a content discovery and/or provision system, which are not illustrated in FIG. 1 for clarity of the description.

In the exemplary embodiments, the metadata entity types include:
1. Programme entity: This type of metadata entity includes data associated with individual TV programmes, such as data describing title, genre, synopsis, tags (key words associated and/or identified with the programme).
2. Topic entity: Topics are a metadata entity defining a collection of key words that are used to describe or summarise the synopsis and/or genre of a TV programme.
3. Contributor entity: Contributors are a metadata entity defining a list of person names that are involved in and/or contribute to producing the TV programmes, including actors, directors and producers.
4. Linear channel entity: Linear channels are a metadata entity defining the names of TV channels from content providers. For example, Sky® Atlantic is the name of a linear channel of TV programmes provided by the applicant.
5. Mood entity: Within the context of the present embodiments, moods are a metadata entity defining a set of labels that reflect types of feelings that human can perceive from an associated TV programme. For example, the content metadata can include one or more of number of types of moods associated with each content item, such as: adventurous, emotional, exciting, feel good, funny, gritty, imaginative, informative, inspiring, jazzy, offbeat, scary, tense, thought-provoking, etc.

The machine learning module 119 of the content discovery system 101 learns semantic relationships among entity types and can be implemented in the technical context of a semantic search engine and/or a recommendation engine. In the semantic search context for example, given a value of any type of entity, the content discovery system 101 is able to return the most relevant information from all type of entities. In the recommendation context for example, if a user has just finished watching a TV programme, the receiver 103 can immediately make recommendation to users about other programmes, by:
1. Collecting tags from the TV programme that a user just watched, embodied in the consumption data 143.
2. Input collected tags as similarity attributes in recommendation queries to the inference module 115.
3. Use the inference module 115 to determine one or more inferred outputs that identify the most relevant topics, linear channels, contributors, moods and other TV programmes as predicted parameters of user behaviour representing associated content items that the user is likely to search for and/or select for viewing/recording.

The content discovery system 101 can be used for a personalized recommendation service as well. For personalized recommendation, the service collects data identifying attributes of a number of TV programmes a user watched in the past and then suggests other similar unwatched TV programmes to this user. The recommended programmes need to be relevant to the watched programmes instead of being randomly selected. To make personalized recommendation, the inference module 115 can be used in the following procedure:
1. For each receiver 103 or user, collect the TV programmes the user(s) has watched in the past.
2. Collect tags from these TV programmes that a user just watched. Create a histogram of tags.
3. The histogram of tags can be used as the attributes of queries to the inference module 115, which returns output attributes identifying the most relevant topics, linear channels, contributors, moods and other TV programmes as a personalized recommendation.

Figure 2:
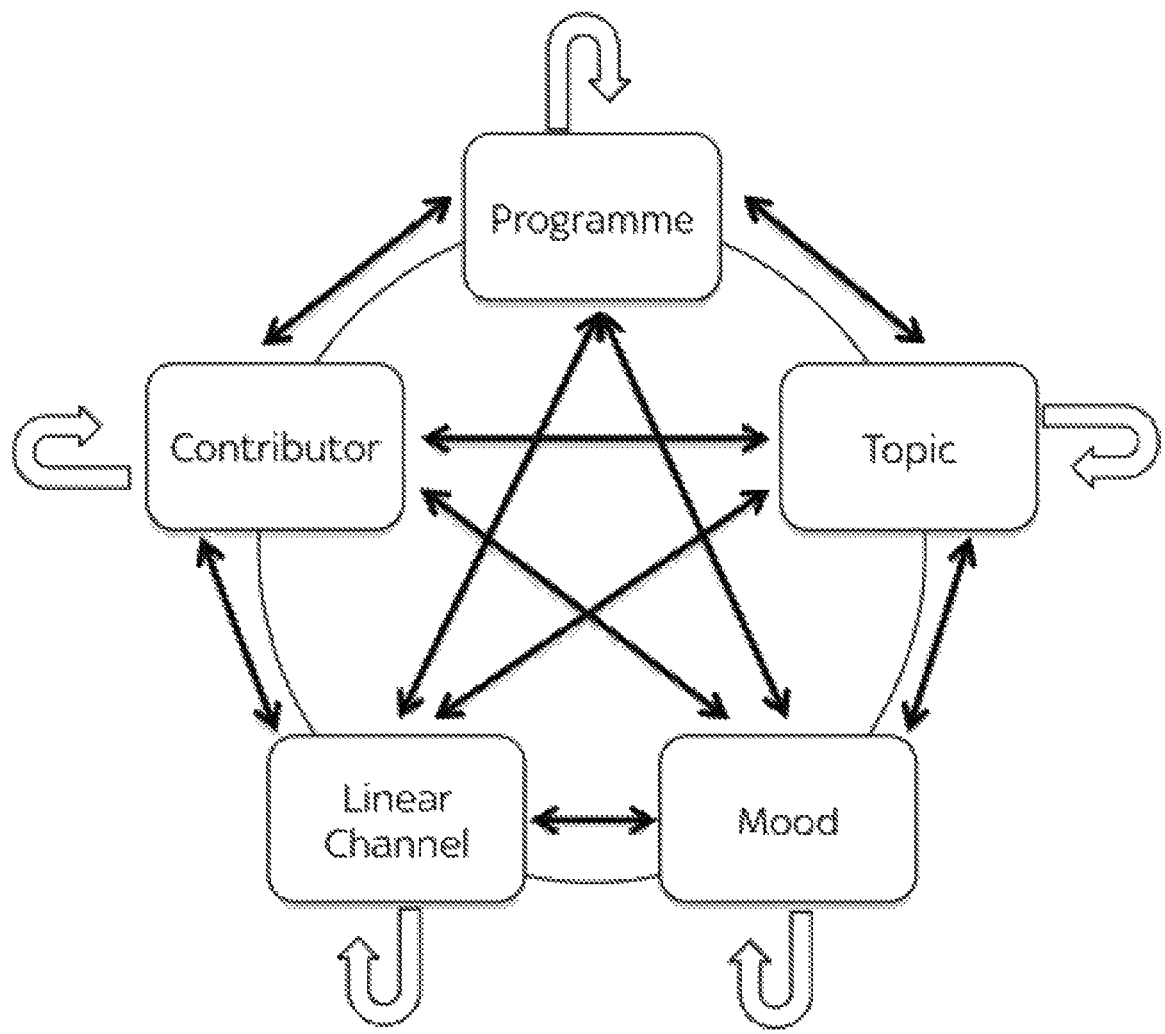
FIG. 2 is a schematic diagram of an inference module 115 in the present exemplary embodiment.

FIG. 2 is a schematic diagram of an inference module 115 in the present exemplary embodiment, in which personalisation can be applied by taking into account different entity types within the architecture (such as in the content metadata 131 or in the consumption data 143 from the receiver 103) in order to meet the scalability required to deliver a highly personalised user experience across a very large set of concurrently connected devices.

The model is based upon a plurality of data structures that enable efficient learning and representation of correlations between every possible combination of values in a particular entity type vocabulary, as well as every possible combination of values between vocabularies of different entity types. Known neural network models for recommendation engines attempt to model all correlations between every possible input value in a single data structure. The difference from such known models to the one described in this embodiment, enabling it to operate with greater flexibility and scalability as well as improved processor and memory efficiencies, is to create a separate and distinct sub-model 113 for each entity type.

For example, referring to the schematic illustration of FIG. 2, when users query a TV programme, the content discovery system 101 of the present exemplary embodiments is able to efficiently:
i. rank all TV programmes based on content similarity of a TV programme to the queried TV programme;
ii. rank all topics based on semantic relevancy of a topic to the queried TV programme;
iii. rank all linear channels based on semantic relevancy of a linear channel to the queried TV programme;
iv. rank all contributors based on semantic relevancy of a contributor to the queried TV programme; and/or
v. rank all moods based on semantic relevancy of a type of mood to the queried TV programme.

When users query a topic, the content discovery system 101 of the present exemplary embodiment is able to efficiently:
i. rank all TV programmes based on semantic relevancy of a TV programme to the queried topic;
ii. rank all other topics based on semantic relevancy of a topic to the queried topic;
iii. rank all linear channels based on semantic relevancy of a linear channel to the queried topic;
iv. rank all contributors based on semantic relevancy of a contributor to the queried topic; and/or
v. rank all types of moods based on semantic relevancy of a mood to the queried topic.

When users query a linear channel, the content discovery system 101 of the present exemplary embodiment is able to efficiently:
i. retrieve TV programmes from this channel and order them by broadcasting time;
ii. rank all other linear channels based on semantic relevancy of a linear channel to the queried linear channel;
iii. retrieve and rank topics from TV programmes in this linear channel;
iv. retrieve and rank contributors from TV programmes in this linear channel; and/or v. rank all types of moods based on semantic relevancy of a mood to TV programmes in the queried linear channel.

When users query the name of a contributor, the content discovery system 101 of the present exemplary embodiment is able to efficiently:
   i. retrieve all TV programmes from this contributor and rank these TV programmes based on the quality of a TV programme from this contributor;
   ii. retrieve and rank all topics based on semantic relevancy of a topic to the queried contributor;
   iii. rank all linear channels based on semantic relevancy of a linear channel to the queried contributor;
   iv. rank all other contributors based on semantic relevancy of a contributor to the queried contributor; and/or
   v. rank all types of moods based on semantic relevancy of mood to the queried contributor.

When users query the name of a type of mood, the content discovery system 101 is able to efficiently:
   i. rank all TV programmes based on semantic relevancy of a TV programme to the queried mood;
   ii. rank all topics based on semantic relevancy of a topic to the queried mood;
   iii. rank all contributors based on semantic relevancy of contributor to the queried mood;
   iv. rank all linear channels based on semantic relevancy of TV programmes in a linear channel to the queried mood; and/or
   v. rank all other types of moods based on the semantic relevancy of a mood to the queried mood.

Figure 3:
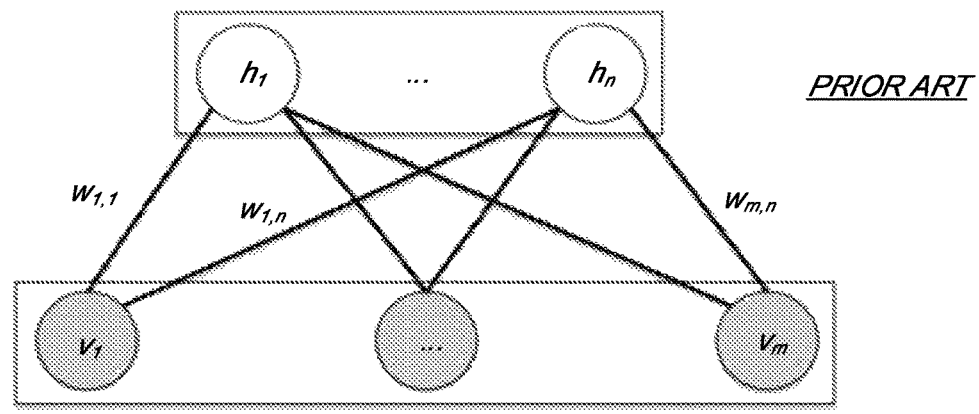
FIG. 3 is a schematically illustration of a basic network structure of a known Restricted Boltzmann Machine (RBM) model.

The content discovery system 101 implements a machine learning model that is an extension of the known Restricted Boltzmann Machine (RBM) model. The basic network structure of an exemplary RBM model is schematically illustrated in FIG. 3, typically defining a number of "visible" nodes $v_1 \ldots v_m$ that correspond to raw data attributes from a training database or corpus. The RMB model may define a number of hidden nodes $h_1 \ldots h_n$, and encode an assumption that every hidden node $h_1 \ldots h_n$ is linked to every visible node $v_1 \ldots v_m$. By iterating through a number of training records passed to the visible input nodes $v_1 \ldots v_m$, the learning algorithm is able to learn a weight value $w_{v,h}$, typically a double-precision value, for every link connecting a visible node $v_1 \ldots v_m$ and a hidden node $h_1 \ldots h_n$. A weight of linkage provides an indication of how strong a visible node $v_1 \ldots v_m$ is connected to a hidden node. Once the model is learned, the linkage weights represents direct correspondences between input data attributes as well as hidden information that is useful for content discovery query handling but may not be obvious from the input data. However, the RBM model is designed for learning abstractive information from only one type of data.

Figure 4A:
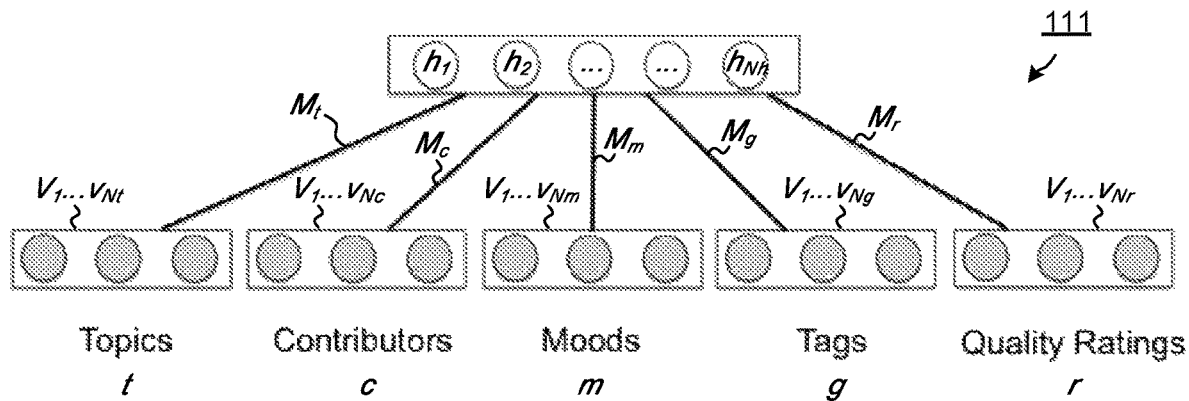
FIGS. 4A and 4B are a schematic illustration of an inference model of the present embodiment, referred to as a Correlational Restricted Boltzmann Machine (CRBM) model.
Figure 4B:
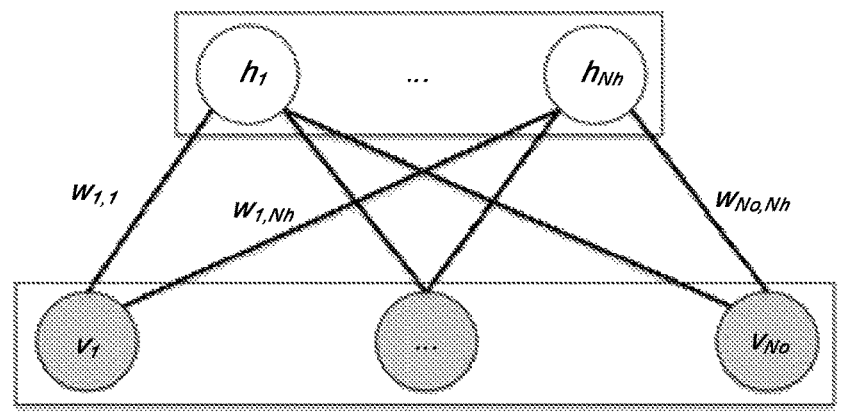

FIG. 4A schematically illustrates the basic network structure of the inference model 111 of the present embodiment, which is an extended version of the RBM model, referred to below as a Correlational Restricted Boltzmann Machine (CRBM) model. FIG. 4B schematically illustrates the basic structure of an individual sub-model 113 of the inference model 111 shown in FIG. 4A. The inference model 111 of the present embodiment enables machine learning of relationships among a number of different types of input data. For example, the CRBM model 111 of the present exemplary embodiment allows observations o of different types of TV programme metadata 131 in the content database 137, such as topics t, contributors c, moods m, tags g and quality ratings r. As shown in FIG. 4, each type of observation (entity) consists of a corresponding number of nodes $v_1 \ldots v_N$ representing the existence of particular values of the corresponding type of entity in the database 137. The CRBM inference model 111 also has a number of hidden nodes $h_1 \ldots h_n$, representing the hidden information. Every node in each observation set $v_1 \ldots v_{No}$ has a link connecting to every node $h_1 \ldots h_{Nh}$ in the hidden layer and every such link is associated with a weight value. Each weight w is a learned parameter value that represents how strong a visible node is related to a hidden node.

In this way, the inference model data 111 consists of a set of trained sub-models 113, hidden state matrices of double-precision values in this embodiment. Referring to the example illustrated in FIG. 4B, $M_t$ is the matrix containing the weights that link every topic value in the database 137 to each one of the $N_h$ hidden nodes $h_1 \ldots h_{Nh}$. With $N_t$ topics, the matrix $M_t$ then has $N_t$ rows and $N_h$ columns. $M_c$ is the matrix containing the weights that link every contributor value in the database 137 to each one of the $N_h$ hidden node $h_1 \ldots h_{Nh}$. With $N_c$ contributors, the matrix $M_c$ then has $N_c$ rows and $N_h$ columns. $M_m$ is the matrix containing the weights that link every mood value in the database 137 to each one of the $N_h$ hidden node $h_1 \ldots h_{Nh}$. With $N_m$ moods, the matrix $M_m$ then has $N_m$ rows and $N_h$ columns. $M_g$ is the matrix containing the weights that link every tag value in the database 137 to each one of the $N_h$ hidden node $h_1 \ldots h_{Nh}$. With $N_g$ tags, the matrix $M_g$ then has $N_g$ rows and $N_h$ columns. $M_r$ is the matrix containing the weights that link every quality rating value in the database 137 to each one of the $N_h$ hidden node $h_1 \ldots h_n$. With $N_r$ tags, the matrix $M_r$ then has $N_r$ rows and $N_h$ columns. Each sub-model therefore stores a data representation of correlations between every possible combination of attribute values of a particular entity type, and selected trained sub-models can be combined to efficiently compute a data representation of correlations between every possible combination of attribute values between different entity types.

Training CRBM

Figure 5:
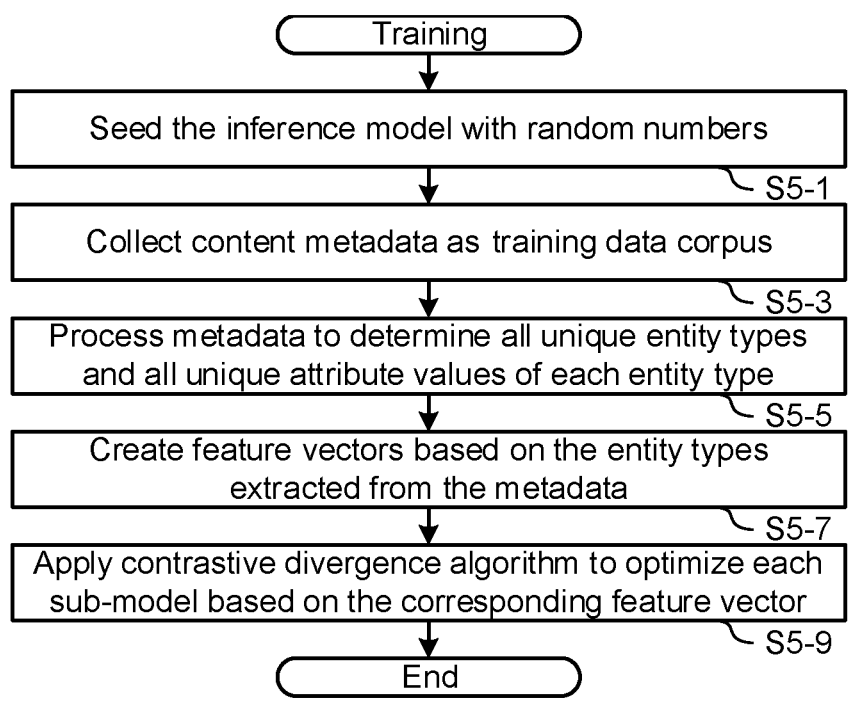
FIG. 5 is a flow diagram illustrating the main processing steps of an inference model training process performed by system components shown in FIG. 1, according to an embodiment.

FIG. 5 is a flow diagram illustrating a computer-implemented training process to generate an inference model 111 for inferring outputs to data queries, using the system 101, in accordance with another embodiment. As shown in FIG. 5, the process begins at step S5-1 where the training module 117 may seed the sub-models 113 of the inference model 111 with random numbers. At step S5-3, the training module 117 collects a training data corpus 145, for example by retrieving content (e.g. TV programme) metadata 131 from the content database 137. At step S5-5, the training module 117 processes the metadata 131 to determine all unique entity types and all unique attribute values of each entity type. For example, the training may extract entities from every TV programme metadata, such as the entity types: topics, moods, contributors, tags and quality ratings.

At step S5-7, the training module 117 creates a set of training samples based on the processed metadata for content items in the database 137. In this embodiment, each training sample consists of a plurality of feature vectors corresponding to the plurality of unique entity types extracted from the metadata 131. Each feature vector defines a plurality of binary values corresponding to each unique attribute value of the respective entity type in the metadata. The binary values identify the association between the attribute values and the corresponding content item. At step S5-9, each set of feature vectors per content item is used as a training query to train the weights (parameters) of the inference model 111. In this exemplary embodiment, the training module 117 applies a Contrastive Divergence Algorithm to optimize the weights of the inference model 111, and thereby co-training the weights of each sub-model 113 of the inference model 111.

As is generally known in the art, the basic contrastive divergence algorithm performs Gibbs sampling and is used inside a gradient descent procedure, to compute weight updates. For example, for each training sample v passed into the model 111 (i.e. the combination of feature vectors created for each content item in the training data corpus 145), the training module 117 may:

- Compute the probabilities of the hidden nodes and sample a hidden activation vector h from this probability distribution.
- Compute the positive gradient as the outer product of v and h.
- Perform a Gibbs sampling step: From h, sample a reconstruction v' of the visible nodes, then resample the hidden activations h' from the result.
- Compute the negative gradient as the outer product of v' and h'.
- Update the weight matrix as the positive gradient minus the negative gradient, multiplied by a predefined learning rate.
- Training is repeated until an error rate for the model 111 is below a predetermined threshold.

Once the inference model 111 is trained in this way, the individual sub-models 113 can be put into operation. The stored model data 111 consisting the corresponding plurality of sub-models 113 may be transmitted to the or each receiver 103 for local storage and use. Preferably, the inference model 111 is not further trained during operation, but may be retrained with further training data sets as required. Alternatively, training may be allowed to continue during operation, but this may involve users giving accurate feedback as to whether the output search results or recommended content items have been accurately determined by the inference module 115.

Use Trained CRBM Model for Knowledge Inference

Figure 6:
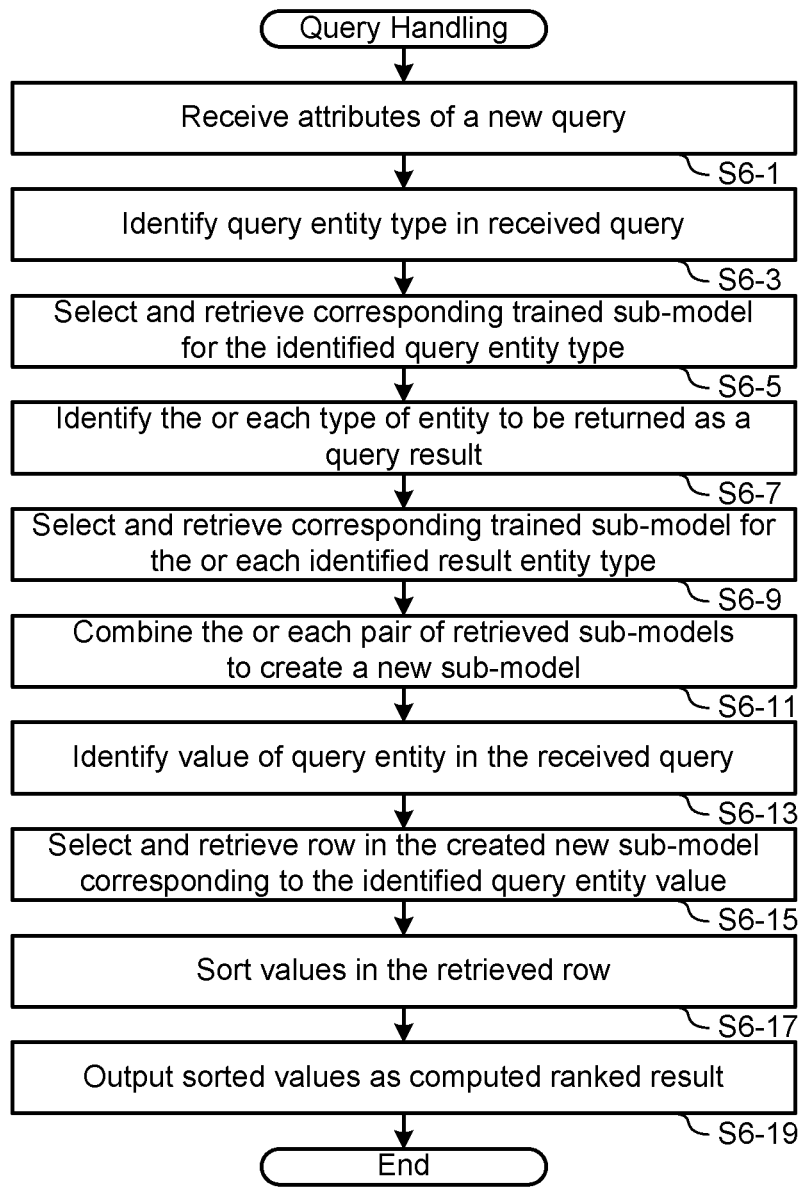
FIG. 6 is a flow diagram illustrating a query handling process by an inference module shown in FIG. 1 to resolve a query using the trained model, according to an embodiment.

FIG. 6 is a flow diagram illustrating a computer-implemented query handling process by the inference module 115 to resolve a query using the trained sub-model 113 to infer an output based on the attributes of the received query, in accordance with another embodiment. Reference is also made to the data flow block diagram of FIG. 7, using corresponding reference numerals to those of preceding figures where appropriate for corresponding elements.

Examples are given of which entity may perform a particular step, but this is purely by way of example and other architectures may be used within the scope of the invention. For example, the inference module 115 of the receiver 103 can be configured to process an inference query using the local stored copy of the inference model 111, without requiring data communication with the server 103. Alternatively, or additionally, the inference engine can be configured to transmit the inference query to a query handling module 109 of the server 103, for processing by the inference module 117 of the machine learning module 111.

As shown in the exemplary embodiment of FIG. 6, the process begins at step S6-1 where the inference module 115 of the receiver 103 receives query attributes 401 of a new query. For example, when the inference model 111 is trained using TV programme metadata 151, the trained model 111 can be used to perform inference of similar TV programmes based on input query attributes that identify one or more entity values of one or more entity types, for example from consumption data 7 collected by the receiver 103. In the present exemplary embodiment, the inference is computed by the inference module 115 of the receiver, with the following procedure:

1. The inference module 115 identifies the type of the query entity in the received query (step S6-3).
2. The inference module 115 selects and retrieves the corresponding trained sub-model for the identified query entity type, the hidden state matrix M1 in this embodiment, from the trained inference model 111 (step S6-5).
3. The inference module 115 identifies the or each type of entity that is to be returned as a result of the received query (step S6-7). The received query may include one or more query attributes defining requested result entity types.
4. The inference module 115 selects and retrieves the corresponding trained sub-model for the or each identified result entity type, the matrix M2 in this embodiment, from the trained inference model 111 (step S6-9).
5. The inference module 115 combines the or each pair of retrieved sub-models, to create a new sub-model having data values that represent the inferred correspondences between the respective entity types (step S6-11). In this embodiment, the inference engine creates a new matrix $M = M1 \times T(M2)$, where $T()$ represents a matrix transpose operation. As a result, every row in the new matrix M corresponds to a particular value in the query entity vocabulary, and every column in the matrix M corresponds to a particular value in the result entity vocabulary.
6. The inference module 115 identifies the or each value of the or each query entity in the received query (step S6-13).
7. The inference module 115 selects and retrieves the or each corresponding row in the created new sub-model, matrix M in this embodiment (step S6-15), that is the row(s) in the combined sub-model corresponding to the identified query entity value(s). Each selected row defines a vector of weights that indicates the inferred strength of linkage between the value in the type of entity in query and all values in the type of entity to be returned. Each vector may be referred to as a hidden state vector. A plurality of retrieved rows for a plurality of query entity values may be combined to derive a combined vector of weights. The combination may consist of a weighted combination of the corresponding weights from each retrieved row. For example, the query may define a "mood" query entity type, and two query entity values having respective proportions, such as 80% weighting of the "funny" query entity value and 20% weighting of the "scary" query entity value. Alternatively or additionally, the query may define a combination of different query entity types, such as "mood" and "topic" (e.g. "funny family drama"). Each query entity value is used to create a feature vector from the corresponding combined matrix and the final weight vector is produced by combining the individual weight vectors from the different query entity types.
8. The inference module 115 sorts the values in the retrieved vector from step S6-15, for example in descending order of weight value (step S6-17).
9. The inference module 115 outputs the computed result defining the ranking of the values in the type of entities to be returned (step S6-19). The output can then be used as a parameter of predicted user behaviour, to control a processing component of the system 101 (step S6-21), such as the selection and/or retrieval of one or more content items 129 from the content database 137 by the head end 105 and/or scheduler 127.

Figure 7:
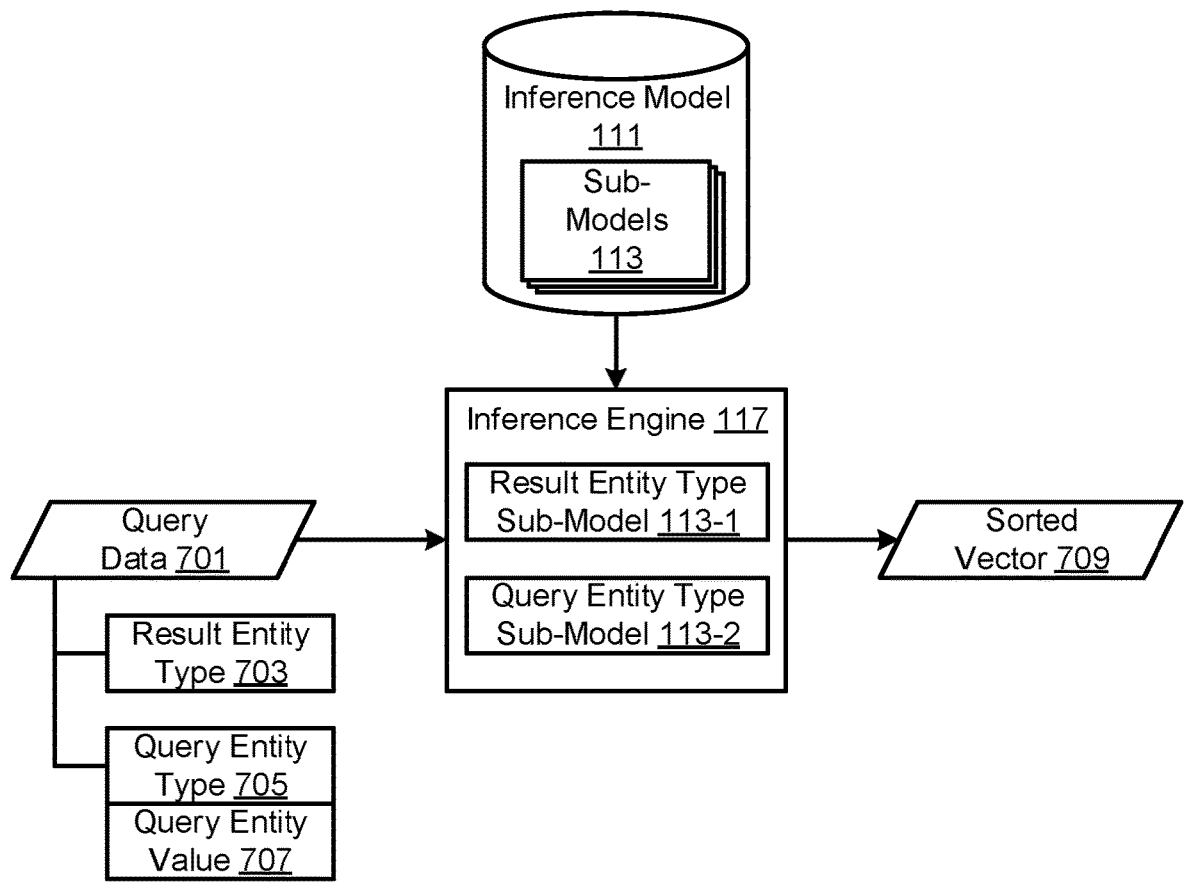
FIG. 7 is a data flow block diagram illustrating an exemplary query handling process.

For example, referring to FIG. 7, if the requested query 701 (or task) is to infer the most relevant contributors (i.e. the result type 703) to a particular topic (i.e. the query type 705), the inference module 115 is configured to perform an exemplary process as follows:

1. Receive a new query for TV shows similar to the "family comedy" topic type, ranked by the "contributor" type. The query data 701 includes data identifying the result entity type 703 as "contributor", the query entity type 705 as "topic", and the query entity value 707 as "family comedy".
2. Select the trained sub-model 113-1 corresponding to the identified query entity type 705 from the inference model 111, which is matrix $M_t$ for the entity type "topic".
3. Select the trained sub-model 113-1 corresponding to the identified result entity type 703 from the inference model 111, which is matrix $M_c$ for the entity type "contributors".
4. Create a new matrix $M=M_t \times T(M_c)$.
5. Based on the specific value of the query attribute 707, which is "family comedy" in this worked example, identify and select the row in the new matrix M corresponding to this topic value 707. The selected row of the new matrix M defines a vector of weights indicating the strength of relevancy of the particular query topic "family comedy" to all contributors.
6. Sort the selected vector of weights in ascending or descending order and output the sorted results 709 as the inferred ranking of all contributors to the particular query topic.

The ranked output can then be used for example by the receiver 103 or the server 121 as a parameter of predicted user behaviour relating to a next programme selection and update or trigger the user interface 141 to operate accordingly.

Further Embodiment—Knowledge Inference for Linear Channels

Figure 8A:
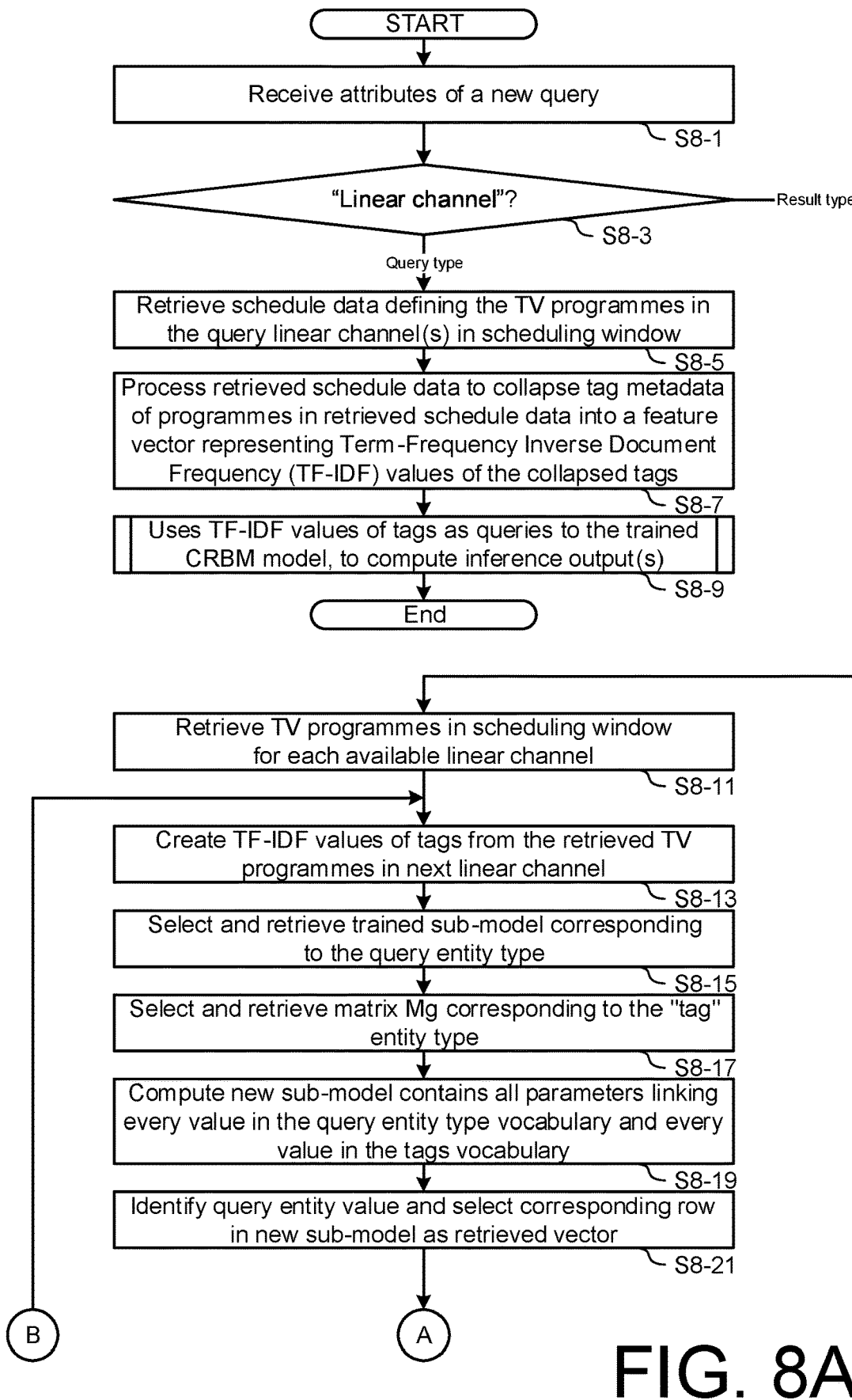
FIGS. 8A and 8B are a flow diagram illustrating another query handling process to resolve an inference query using the trained model in accordance with a further embodiment.
Figure 8B:
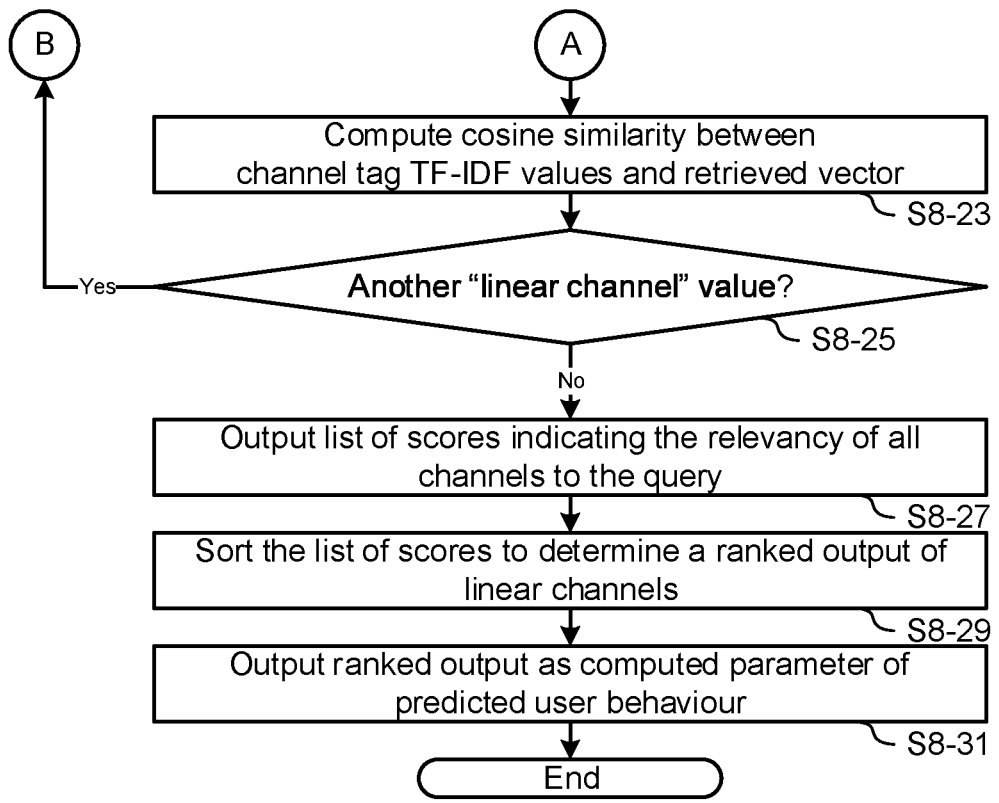

Referring back to FIG. 4B, the illustrated CRBM inference model 111 does not include a "linear channel" entity. This is because TV programmes in a linear channel are continuously changing. To handle this dynamic nature of linear channels, the present embodiment is adapted to separate out linear channel entity inference from the CRBM model 111 and implement additional processing for this particular type of entity, to compute predicted links between the query linear channel entities to other types of entities. FIG. 8 is a flow diagram illustrating another computer-implemented query handling process to resolve an inference query using the trained sub-models 113 in accordance with this further embodiment.

As shown in FIG. 8, the process begins at step S8-1 where the query handling module 109 receives a new query identifying "linear channels" as the query type, and one or more specific linear channel values. At step S8-3, the inference module 115 determines if the linear channel type is specified as a query type 705 or a result type 703. If it is determined that the linear channel type is specified as a query type 705, then at step S8-5, the inference module 115 retrieves schedule data defining the TV programmes in the query linear channels scheduled from now to next N hours, where N is a configurable parameter defining a query scheduling window. For example, a typical scheduling window value may be N=12 hours. At step S8-7, the inference module 115 processes the retrieved schedule data to identify the TV programmes in the query scheduling window, and processes metadata 131 of the identified content items to generate a feature vector for the or each query channel value, representing the association between the channel value and a defined metadata entity type, such as the tags metadata.

Preferably, the inference module 115 may process metadata 131 of the identified content items to reduce the dimensionality, for example by collapsing the tags metadata of all the programmes in the retrieved schedule data into feature vectors representing the Term-Frequency Inverse Document Frequency (TF-IDF) values of the collapsed tags per channel. Alternatively, the inference module 115 may implement other known algorithms to reduce the dimensionality based on statistical modelling, such as Term-Frequency alone, Latent Dirichlet Allocation, etc. At step S8-9, the inference module 115 uses the TF-IDF values of tags as queries to the trained CRBM model 111, as described above with reference to FIG. 6, to infer for example:

a. the most relevant topics,
b. the most relevant actors, and
c. the most relevant moods.

On the other hand, if it is determined at step S8-3 that the linear channel type is specified as a result type 703, then at step S8-11, the inference module 115 retrieves the TV programmes scheduled in next N hours in each available linear channel, for example from scheduling data from the scheduler 127. At step S8-11, the inference module 115 creates TF-IDF values of tags from the retrieved TV programmes in a linear channel, this being the first available channel identified in the scheduling data. At step S8-15, for the (or each) query entity type 705 in the received query 701, retrieve the corresponding trained CRBM sub-model 113, e.g. matrix $M_1$ with weights relating values of the particular entity type to hidden nodes of the inference model 111. At step S8-17, the inference module 115 selects the sub-model 113, i.e. matrix $M_g$, that represents the "tag" entity type.

At step S8-19, the inference module 115 computes a new sub-model M, e.g. matrix $M=M_1 \times T(M_g)$, so that M contains all parameters (weights) linking every value in the query entity type vocabulary and every value in the tags vocabulary. At step S8-21, the inference module 115 identifies the query entity value 707 and selects the corresponding row in the new sub-model, e.g. matrix M. The retrieved row is a vector of weights for each value in the tags vocabulary. At step S8-23, the inference module 115 computes the cosine similarity between the channel tag TF-IDF values created at step S8-11 and the vector selected and retrieved at step S8-21. The computation produces a score indicating the relevancy of a particular channel to the query entity value 707 in the query 701. Steps S8-13 to S8-23 are repeated for all of the available linear channels. At step S8-25, after the inference module 115 determines that all of the linear channels have been processed, a list of scores is output at step S8-27, indicating the relevancy of all channels to the query. At step S8-29, the inference module 115 sorts the list of scores from step S8-25 to determine a ranked output of linear channels. The ranked output can then be output at step S8-31, for use by the receiver for example as a parameter of predicted user behaviour relating to a next channel selection and update or trigger the user interface 141 to operate accordingly.

It is appreciated that the inference module 115 may instead or additionally creates TF-IDF values of other entity types from the metadata of the retrieved TV programmes in the linear channel(s).

Example Receiver

Figure 9:
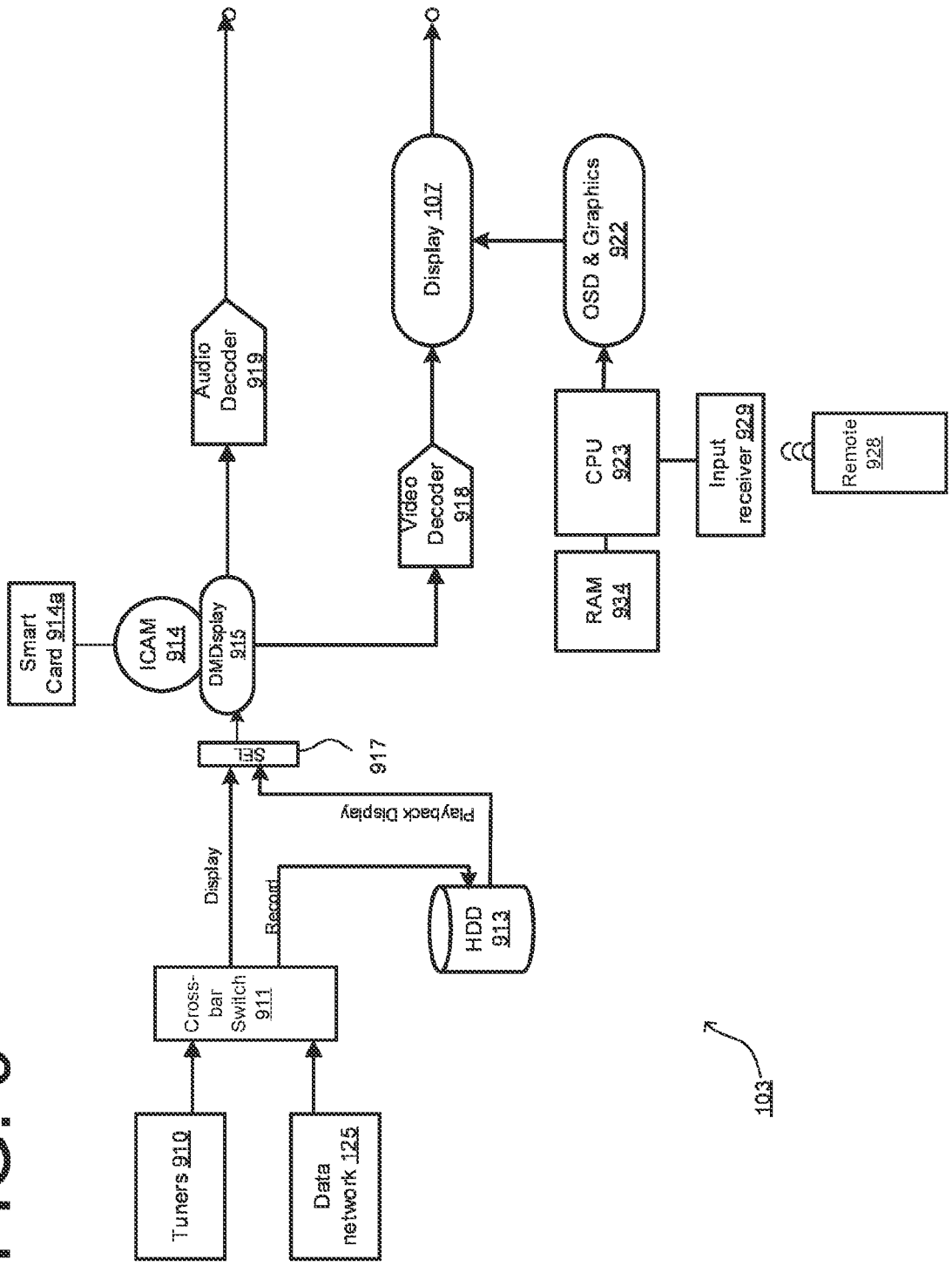
FIG. 9 is a data flow block diagram schematically illustrating the components of an exemplary receiver for use in specific embodiments of the invention.

FIG. 9 shows schematically the components of the receiver 103 for use in specific embodiments of the invention. In this example, received broadcast signals are input to tuners 910 tuneable into the same or different channels of the broadcast network for simultaneous reception of the same or different television programmes and/or media items. Signals from the tuners 910 are passed to a crossbar switch 911 which separates the data received from the tuners 910 into data for direct output to a display, data representing received television programmes for recording and subsequent playback, and user services and programme scheduling data, in accordance with the XSI standard, for example. The receiver 103 has a hard disk (or other storage medium) 913 which receives from the crossbar switch 911 compressed video and/or audio data for recording and subsequent playback The received signals comprise digitally encoded data. In this example, the data is compressed using the Digital Video Broadcast/Moving Pictures Expert Group 2 or 4 (DVB/MPEG 2/4) or H.264 standard which permits both programme data and additional data (for example metadata and/or schedule data) to be transmitted in a single channel. The hard disk 913 receives and stores compressed data. The data is decompressed only after retrieval from the hard disk 913.

Satellite (and indeed cable) programmes are usually scrambled to restrict access to authorised users e.g. subscribers. The receiver 103 therefore has an Integrated Conditional Access Module (ICAM) 914 which co-operates with a smart card 914a to determine whether the viewer has subscribed to a particular channel and is therefore authorised to access the channel. Parental control over channel access is also provided, at least in part, by the ICAM 914. The receiver 103 further comprises a demultiplexing and descrambling circuit 915 which receives from a selector 917 data from the crossbar switch 911 for direct output or data from the hard disk 913 for playback. The demultiplexing and descrambling circuit 915 separates the data into video data and audio data for distribution to various locations within the receiver 103. The demultiplexing and descrambling circuit 915 is also controlled by the ICAM 914 to enable the descrambling of the signal by authorised users. The receiver 103 also comprises a video decoder 918 for decompression and processing of encoded video data received from the demultiplexing and descrambling circuit 915, and an audio decoder 919 for decompression and processing of compressed audio data, operating according to the MPEG 2/4 standard, for example.

Decompressed video data is supplied to display circuitry 920 combines the decompressed video data with on-screen display and graphics generated by on-screen display and graphics generation circuitry 922 using the user services and programme scheduling data, and outputs the combined video data to the display 107, for example over an HDMI interface.

The receiver 103 is controlled by a processor 923 which communicates with the various units of the receiver via a bus (not shown). The processor 923 has associated with it Random Access Memory (RAM) 934. The processor 923 controls operation of the receiver 103 by tuning the tuners 910 to receive signals for the desired channels so that the desired programme and/or interactive service data is displayed on the screen of the display 107, and by controlling the hard disk 913 to record desired television programmes or to play back previously recorded television programmes. Viewer selection of desired programmes and customer services is controlled by viewer manipulation of a remote control unit 928, which in response to such viewer manipulation transmits control signals to an input receiver 929 for input to the processor 923. The remote control unit 928 also allows the viewer to control of the operation of the hard disk 913 to record television programmes, to play back recorded television programmes and to program the recording of television programmes, etc.

Operation of the receiver 103 is controlled by software that makes the processor 123 responsive to control signals from the remote control unit 928 and/or additional data in the received signals.

The receiver 103 also includes an external data network interface 935, such as a wired or wireless network interface, or a telephony interface with modem, enabling a bidirectional data connection to a network, such as a local area network (LAN), wide-area network (WAN) or the Internet. This interface allows media content, such as Video-on-Demand (VOD) content to be downloaded to the receiver 103, for immediate viewing and/recording.

Example Computer System Implementation

Figure 10:
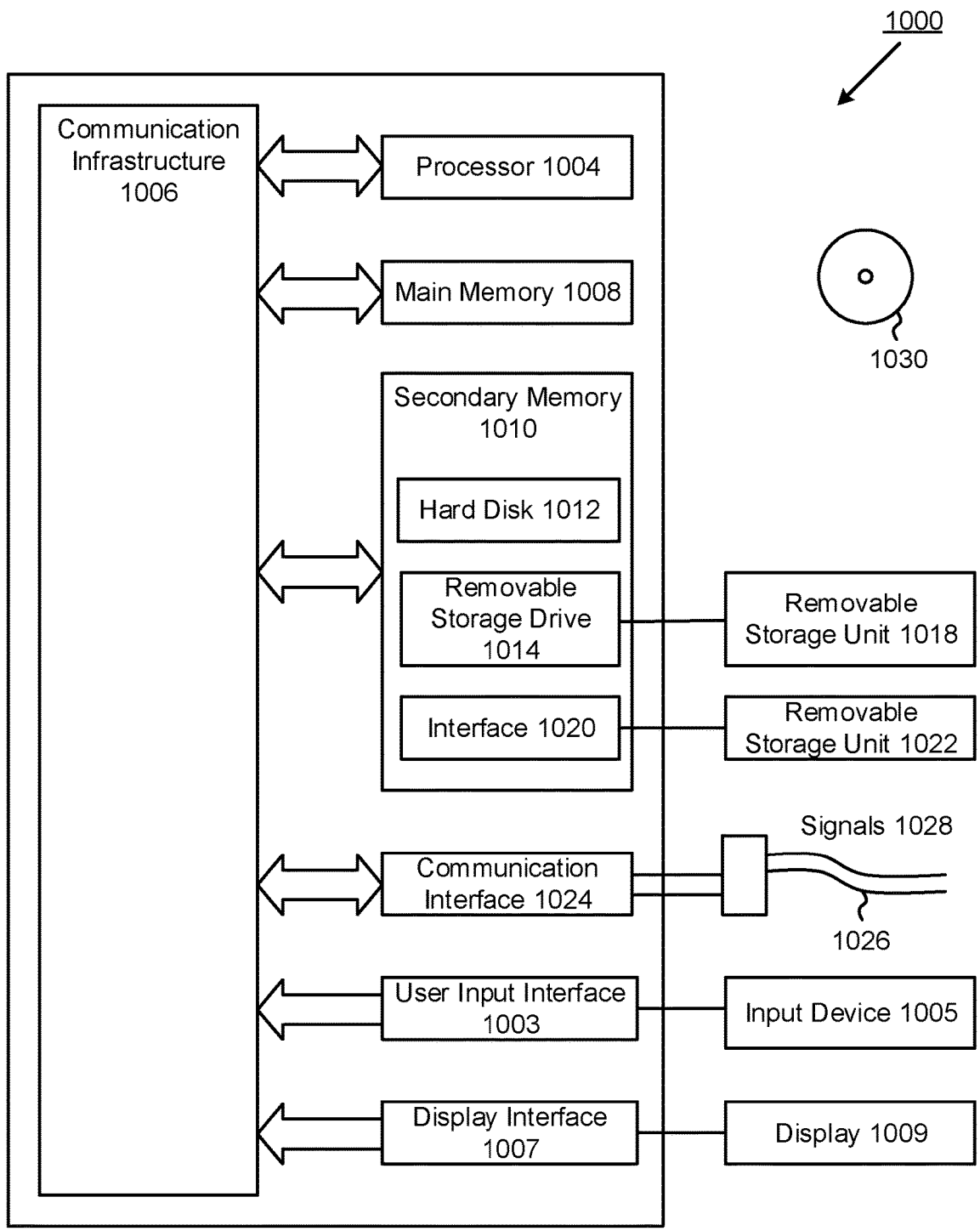
FIG. 10 is a diagram of an example of a computer system on which one or more of the functions of the embodiments may be implemented.

FIG. 10 illustrates an example computer system 1000 in which the present invention, or portions thereof, can be implemented as computer-readable code to program processing components of the computer system 1000. For example, the methods illustrated by the flowcharts of FIG. 5 can be implemented in system 1000. The system 121 of FIG. 1 can also be implemented in system 1000. Various embodiments of the invention are described in terms of this example computer system 1000. After reading this description, it will become apparent to a person skilled in the relevant art how to implement the invention using other computer systems and/or computer architectures.

Computer system 1000 includes one or more processors, such as processor 1004. Processor 1004 can be a special purpose or a general-purpose processor. Processor 1004 is connected to a communication infrastructure 1006 (for example, a bus, or network). Computer system 1000 also includes a user input interface 1003 connected to one or more input device(s) 1005 and a display interface 1007 connected to one or more display(s) 1009, which may be integrated input and display components. Input devices 1005 may include, for example, a pointing device such as a mouse or touchpad, a keyboard, a touchscreen such as a resistive or capacitive touchscreen, etc.

Computer system 1000 also includes a main memory 1008, preferably random access memory (RAM), and may also include a secondary memory 1010. Secondary memory 1010 may include, for example, a hard disk drive 1012, a removable storage drive 1014, flash memory, a memory stick, and/or any similar non-volatile storage mechanism. Removable storage drive 1014 may comprise a floppy disk drive, a magnetic tape drive, an optical disk drive, a flash memory, or the like. The removable storage drive 1014 reads from and/or writes to a removable storage unit 1018 in a well-known manner. Removable storage unit 1018 may comprise a floppy disk, magnetic tape, optical disk, etc. which is read by and written to by removable storage drive 1014. As will be appreciated by persons skilled in the relevant art(s), removable storage unit 1018 includes a non-transitory computer usable storage medium having stored therein computer software and/or data.

In alternative implementations, secondary memory 1010 may include other similar means for allowing computer programs or other instructions to be loaded into computer system 1000. Such means may include, for example, a removable storage unit 1022 and an interface 1020. Examples of such means may include a program cartridge and cartridge interface (such as that found in video game devices), a removable memory chip (such as an EPROM, or PROM) and associated socket, and other removable storage units 1022 and interfaces 1020 which allow software and data to be transferred from the removable storage unit 1022 to computer system 1000.

Computer system 1000 may also include a communications interface 1024. Communications interface 1024 allows software and data to be transferred between computer system 1000 and external devices. Communications interface 1024 may include a modem, a network interface (such as an Ethernet card), a communications port, a PCMCIA slot and card, or the like.

Various aspects of the present invention can be implemented by software and/or firmware (also called computer programs, instructions or computer control logic) to program programmable hardware, or hardware including special-purpose hardwired circuits such as application-specific integrated circuits (ASICs), programmable logic devices (PLDs), field-programmable gate arrays (FPGAs), etc. of the computer system 1000, or a combination thereof. Computer programs for use in implementing the techniques introduced here may be stored on a machine-readable storage medium and may be executed by one or more general-purpose or special-purpose programmable microprocessors. The terms "computer program medium", "non-transitory computer readable medium" and "computer usable medium" introduced herein can generally refer to media such as removable storage unit 1018, removable storage unit 1022, and a hard disk installed in hard disk drive 1012. Computer program medium, computer readable storage medium, and computer usable medium can also refer to memories, such as main memory 1008 and secondary memory 1010, which can be memory semiconductors (e.g. DRAMs, etc.). These computer program products are means for providing software to computer system 1000.

Computer programs are stored in main memory 1008 and/or secondary memory 1010. Computer programs may also be received via communications interface 1024. Such computer programs, when executed, enable computer system 1000 to implement the present invention as described herein. In particular, the computer programs, when executed, enable processor 1004 to implement the processes of the present invention, such as the steps in the methods illustrated by flowchart of FIG. 5 and server 121 of FIG. 1 described above. Accordingly, such computer programs represent controllers of the computer system 1000. Where the invention is implemented using software, the software may be stored in a computer program product and loaded into computer system 1000 using removable storage drive 1014, interface 1020, hard drive 1012, or communications interface 1024.

Embodiments of the invention employ any computer useable or readable medium, known now or in the future. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nano-technological storage device, etc.), and communication mediums (e.g., wired and wireless communications networks, local area networks, wide area networks, intranets, etc.).

Alternative Embodiments

It will be understood that embodiments of the present invention are described herein by way of example only, and that various changes and modifications may be made without departing from the scope of the invention.

For example, aspects of the invention are applicable to audio-only content, such as digital radio broadcasts, or a mixture of video and audio-only content.

In the above embodiments, the inference output is used to control the receiver or head end. As an alternative, the inference output may be stored as user profile data, and other operations may be performed based on the user profile data. The system may be further configured to determine similar users or groups of similar users based on the user profile data, and to provide recommendations based on the preferences or viewing habits of the similar users.

It will be appreciated that although the respective processes and associated processing modules are described as separate embodiments, aspects of the described embodiments can be combined to form further embodiments. For example, alternative embodiments may comprise one or more of the training and inference aspects described in the above embodiments.

Reference in this specification to "one embodiment" are not necessarily all referring to the same embodiment, nor are separate or alternative embodiments mutually exclusive of other embodiments. In particular, it will be appreciated that aspects of the above described embodiments can be combined to form further embodiments. Similarly, various features are described which may be exhibited by some embodiments and not by others. Yet further alternative embodiments may be envisaged, which nevertheless fall within the scope of the following claims.

The invention claimed is:

1. A computer-implemented method of presenting content to a user, comprising steps performed by one or more computer processors of:
    storing, in a memory, data defining a trained neural network including:
        an input layer consisting sets of input nodes corresponding to respective attribute types in media content metadata, each input node in a set corresponding to a respective attribute value of one of a plurality of predefined attribute types, and
        a hidden layer consisting each connected to a plurality of hidden nodes, each hidden node connected to every input node of the input layer and having a corresponding weight embodying a strength of connection, therebetween
    wherein the trained weights each set of input nodes define a respective sub-model of the neural network that is associated with a corresponding attribute type in the media content metadata, each sub-model comprising a hidden state matrix of trained weights between the corresponding set of input nodes and said plurality of hidden nodes;
    processing a request for content assets, the request identifying an attribute value of a query attribute type, by:
        retrieving, from the memory, the hidden state matrices of first and second sub-models of the trained neural network, the first sub-model corresponding to a query attribute type and the second sub-model corresponding to a target attribute type;
        determining a combined hidden state matrix by combining the retrieved hidden state matrices of the first and second sub-models, the combined hidden state matrix consisting a plurality of hidden state vectors associated with a corresponding query or target attribute value;

determining the hidden state vector from the combined hidden state matrix corresponding to the attribute value identified in the request, the determined hidden state vector defining parameters embodying predicted relevancy between the query attribute type and the target attribute type;

determining one or more relevancy parameters for the user based on the determined hidden state vector; and selecting one or more content assets for presentation by a media receiver device, wherein the or each selected content asset is based on a determined relevancy parameter.

2. The method of claim 1, wherein combining the hidden state matrices comprises multiplying the first hidden state matrix with a transpose of the second hidden state matrix.

3. The method of claim 2, wherein the attribute value identified in the request is used as an index to address a row of the matrix multiplication result.

4. The method of claim 1, further comprising sorting the values of the hidden state vector according to defined criteria, to determine a plurality of ranked relevancy parameters for the user.

5. The method of claim 4, wherein the hidden state vector is sorted into ascending or descending order based on the weight values.

6. The method of claim 1, further comprising retrieving the selected one or more content assets for transmission to the media receiver device.

7. The method of claim 1, wherein the request further identifies the target attribute type.

8. The method of 1, wherein the or each determined relevancy parameter identifies output attributes associated with respective content assets in a database.

9. The method of claim 8, wherein the request is generated by a scheduler of a content provider based on consumption data received from a media receiver device.

10. The method of claim 9, wherein the output attributes are used to control the scheduler to retrieve the corresponding content assets.

11. The method of claim 1, wherein the request is a user defined request for content assets based on the attribute value of a query attribute type.

12. The method of claim 11, wherein the query is generated by the media receiver device in response to user input to a search interface.

13. The method of claim 12, wherein the output attributes are used to control the media receiver device to generate a listing of corresponding content assets.

14. The method of claim 1, wherein the request identifies a plurality of attribute values of the same query attribute or of different query attributes, and wherein each attribute value is used as an index to retrieve a respective hidden state vector from the combined hidden state matrix, the plurality of hidden state vectors being combined and sorted to define the ranked relevancy parameters between the query attribute type or types and the target attribute type for the user.

15. The method of claim 1, further comprising training the sub-models of the neural network by:

collecting metadata from a database, the metadata associated with content assets in the database and including attribute values of respective entity types;

processing the metadata to determine all unique entity types and all unique attribute values of each entity type;

creating a feature vector for each determined entity type, each feature vector defining an addressable plurality of data values corresponding to each unique attribute value of the respective entity type in the metadata; and applying a contrastive divergence algorithm to the feature vectors to compute trained parameters of the model data.

16. A method of processing a data query for semantically similar media content based on a defined attribute type, the data query identifying a broadcast channel associated with a linear schedule of media content, the method comprising retrieving metadata of the content within a scheduling window, generating a feature vector from the retrieved metadata of the defined attribute type, generating a second query for content assets, the second query including the generated feature vector as the query attribute type, and processing the second query in accordance with the method of claim 1.

17. A method of processing a data query for semantically similar broadcast channels associated with respective linear schedules of media content based on a defined query attribute type and value, the data query identifying the channel type as a target attribute type, the method comprising:

a) for each of a plurality of broadcast channels:
retrieving metadata of media content within a scheduling window of the broadcast channel,
generating a feature vector from the retrieved metadata of the defined attribute type,
selecting first and second sub-models from a trained artificial neural network model comprising an input layer consisting sets of input nodes corresponding to respective attribute types in media content metadata, each input node in a set corresponding to a respective attribute value of one of a plurality of predefined attribute types, and a hidden layer consisting each connected to a plurality of hidden nodes, each hidden node connected to every input node of the input layer and having a corresponding weight embodying a strength of connection therebetween, wherein the trained weights of each set of input nodes define a respective sub-model of the neural network that is associated with a corresponding attribute type in the media content metadata, each sub-model consisting a hidden state matrix of trained weights between the corresponding set of input nodes and said plurality of hidden nodes;
combining the hidden state matrices of the selected first and second sub-models to determine a combined hidden state matrix consisting a plurality of hidden state vectors associated with a corresponding query attribute value;
determining the hidden state vector from the combined hidden state matrix corresponding to the identified query attribute value from the query data;
computing the cosine similarity between the feature vector and the determined hidden state vector to produce a score indicating relevancy of the broadcast channel to the query attribute value;

b) sorting the plurality of computed scores indicating relevancy of the plurality of broadcast channels to the query attribute value; and c) outputting data identifying a ranked listing of broadcast channels based on the sorting plurality of computed scores.

18. An apparatus comprising one or more computer processors configured to process a request for content assets, the request identifying an attribute value of a query attribute type, by:

retrieving, from a memory, first and second sub-models of a trained neural network, the first sub-model corresponding to a query attribute type and the second sub-model corresponding to a target attribute type, wherein data defining the trained neural network includes an input layer consisting sets of input nodes corresponding to respective attribute types in media content metadata, each input node in a set corresponding to a respective attribute value of one of a plurality of predefined attribute types, and a hidden layer consisting each connected to a plurality of hidden nodes, each hidden node connected to every input node of the input layer and having a corresponding weight embodying a strength of connection therebetween, wherein the trained weights of each set of input nodes define a respective sub-model of the neural network that is associated with a corresponding attribute type in the media content metadata, each sub-model consisting a hidden state matrix of trained weights between the corresponding set of input nodes and said plurality of hidden nodes;

determining one or more relevancy parameters for the user by:

combining the hidden state matrices of the retrieved first and second sub-models to determine a combined hidden state matrix consisting a plurality of hidden state vectors associated with a corresponding query or target attribute value;

determining the hidden state vector from the combined hidden state matrix corresponding to the attribute value identified in the request, the determined hidden state vector defining parameters embodying predicted relevancy between the query attribute type and the target attribute type;

determining the hidden state vector from the combined hidden state matrix corresponding to the attribute value identified in the request, the hidden state vector defining parameters embodying predicted relevancy between the query attribute type and the target attribute type for the user; and determining one or more relevancy parameters for the user based on the determined hidden state vector; and selecting one or more content assets for presentation by a media receiver device, wherein the or each selected content asset is based on a determined relevancy parameter.

19. A non-transitory computer-readable medium comprising computer-executable instructions that when executed perform the method of processing a request for content assets, the request identifying an attribute value of a query attribute type, by:

retrieving, from the memory, first and second sub-models of the trained neural network, the first sub-model corresponding to a query attribute type and the second sub-model corresponding to a target attribute type, wherein data defining the trained neural network includes an input layer consisting sets of input nodes corresponding to respective attribute types in media content metadata, each input node in a set corresponding to a respective attribute value of one of a plurality of predefined attribute types, and a hidden layer consisting each connected to a plurality of hidden nodes, each hidden node connected to every input node of the input layer and having a corresponding weight embodying a strength of connection therebetween, wherein the trained weights of each set of input nodes define a respective sub-model of the neural network that is associated with a corresponding attribute type in the media content metadata, each sub-model consisting a hidden state matrix of trained weights between the corresponding set of input nodes and said plurality of hidden nodes;

determining one or more relevancy parameters for the user by:

combining the hidden state matrices of the retrieved first and second sub-models to determine a combined hidden state matrix consisting a plurality of hidden state vectors associated with a corresponding query or target attribute value;

determining the hidden state vector from the combined hidden state matrix corresponding to the attribute value identified in the request, the determined hidden state vector defining parameters embodying predicted relevancy between the query attribute type and the target attribute type;

determining the hidden state vector from the combined hidden state matrix corresponding to the attribute value identified in the request, the hidden state vector defining parameters embodying predicted relevancy between the query attribute type and the target attribute type for the user; and determining one or more relevancy parameters for the user based on the determined hidden state vector; and selecting one or more content assets for presentation by a media receiver device, wherein the or each selected content asset is based on a determined relevancy parameter.

* * * * *